(12) United States Patent
Guda et al.

(10) Patent No.: US 8,898,423 B1
(45) Date of Patent: Nov. 25, 2014

(54) HIGH PERFORMANCE CACHING ARCHITECTURE FOR DATA STORAGE SYSTEMS

(75) Inventors: Chandra M. Guda, Lake Forest, CA (US); Michael Ainsworth, Longmont, CO (US); Choo-Bhin Ong, Foothill Ranch, CA (US); Marc-Angelo P. Carino, San Diego, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 317 days.

(21) Appl. No.: 13/363,200

(22) Filed: Jan. 31, 2012

(51) Int. Cl.
*G06F 12/10* (2006.01)

(52) U.S. Cl.
USPC ........... 711/202; 711/103; 711/108; 711/118; 711/206; 711/208; 711/209

(58) Field of Classification Search
CPC . G06F 12/0292; G06F 12/1027; G06F 12/10; G06F 12/0246; G06F 12/0284
USPC ................. 711/103, 108, 118, 202, 206, 208, 711/E12.001, E12.008, E12.017, E12.061, 711/E12.016, E12.065
See application file for complete search history.

(56) References Cited

U.S. PATENT DOCUMENTS

| | | | |
|---|---|---|---|
| 5,966,726 A | 10/1999 | Sokolov | |
| 6,553,457 B1 | 4/2003 | Wilkins et al. | |
| 6,601,137 B1 | 7/2003 | Castro et al. | |
| 6,606,682 B1 | 8/2003 | Dang et al. | |
| 6,725,329 B1 | 4/2004 | Ng et al. | |
| 6,725,342 B1 | 4/2004 | Coulson | |
| 6,845,427 B1 | 1/2005 | Atai-Azimi | |
| 6,862,660 B1 | 3/2005 | Wilkins et al. | |
| 6,880,043 B1 | 4/2005 | Castro et al. | |
| 6,996,669 B1 | 2/2006 | Dang et al. | |
| 7,308,531 B2 | 12/2007 | Coulson | |
| 7,356,651 B2 | 4/2008 | Liu et al. | |
| 7,392,340 B1 | 6/2008 | Dang et al. | |
| 7,424,577 B2 | 9/2008 | Bali et al. | |
| 7,634,585 B2 | 12/2009 | Conley et al. | |
| 7,725,661 B2 | 5/2010 | Liu et al. | |
| 7,831,634 B2 | 11/2010 | Petev et al. | |
| 2005/0125614 A1 | 6/2005 | Royer, Jr. | |
| 2005/0172082 A1 | 8/2005 | Liu et al. | |
| 2006/0143360 A1 | 6/2006 | Petev et al. | |
| 2006/0143427 A1 | 6/2006 | Marwinski et al. | |
| 2006/0248124 A1 | 11/2006 | Petev et al. | |
| 2008/0294846 A1 | 11/2008 | Bali et al. | |
| 2010/0268881 A1 | 10/2010 | Galchev et al. | |
| 2012/0239853 A1* | 9/2012 | Moshayedi | 711/103 |

* cited by examiner

*Primary Examiner* — Jasmine Song

(57) ABSTRACT

A data storage system is disclosed that utilizes a high performance caching architecture. In one embodiment, the caching architecture utilizes a cache table, such as a lookup table, for referencing or storing host data units that are cached or are candidates for being cached in the solid-state memory. Further, the caching architecture maintains a segment control list that specifies associations between particular cache table entries and particular data segments. Such separation of activities related to the implementation of a caching policy from activities related to storing cached data and candidate data provides robustness and scalability while improving performance.

25 Claims, 9 Drawing Sheets

HIGH PERFORMANCE CACHING ARCHITECTURE FOR DATA STORAGE SYSTEMS

BACKGROUND

1. Technical Field

This disclosure relates to data storage systems, such as disk drives, for computer systems. More particularly, the disclosure relates to high performance caching architectures for data storage systems.

2. Description of the Related Art

Data storage systems, such as disk drives that comprise solid-state memory, generally utilize one or more levels of cache memory to improve performance. For example, cache memory can be used to store data that is frequently accessed by a host system. A caching architecture should provide high performance while maintaining data integrity. When host data is stored both in the cache memory and permanent storage of a data storage system, the architecture must monitor which copy of host data is valid and provide valid data to the host upon request. Thus, there exists a need for a reliable, efficient, and scalable caching architecture for data storage systems.

BRIEF DESCRIPTION OF THE DRAWINGS

Systems and methods that embody the various features of the invention will now be described with reference to the following drawings, in which.

DETAILED DESCRIPTION OF SPECIFIC EMBODIMENTS

Figure 1:
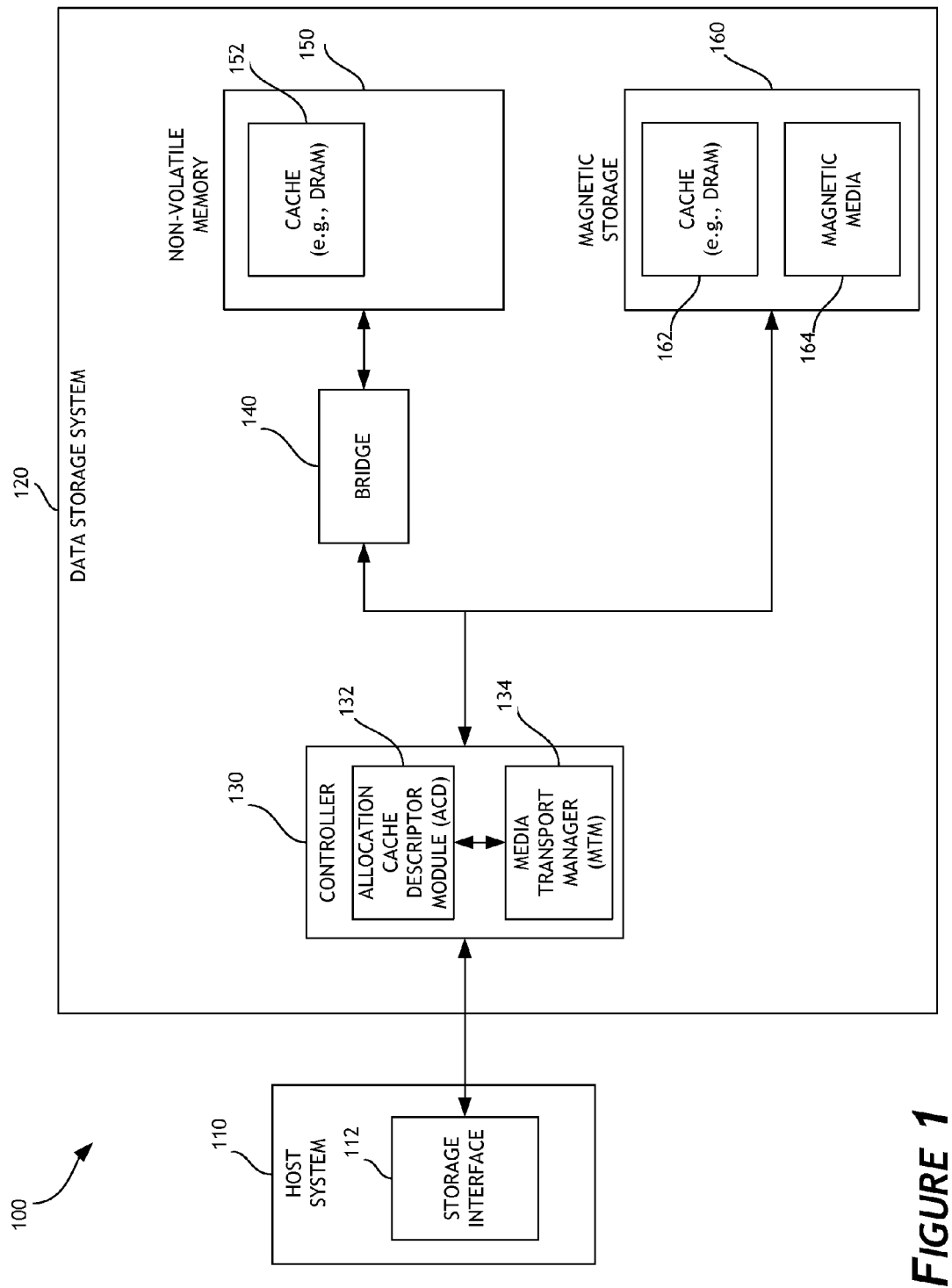
FIG. 1 illustrates a combination of a host system and a data storage system according to one embodiment of the invention.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Data storage systems, such as hard disk drives, hybrid disk drives, and solid state drives, may utilize caching architectures to improve performance. For example, frequently accessed data and data accessed during start up can be stored in cache memory to speed up access. A caching architecture may utilize a linear array for caching data. Such an approach provides simplicity. However, for storage systems that cache large amounts of data (e.g., hybrid disk drives) and/or utilize multiple levels of cache memory, storing and locating data in the linear array becomes inefficient. In addition, a caching architecture should provide mechanisms for ensuring data integrity and coherency, especially when multiple copies of data are stored in different portions or levels of cache memory and/or in permanent storage.

In some embodiments of the present invention, a data storage system, such as a hybrid disk drive, comprises magnetic media and a solid-state memory array (e.g., NAND memory), at least part of which is utilized as cache memory. To achieve optimal performance, the data storage system can employ a caching architecture that provides robust, reliable, scalable, and efficient performance during data storage and retrieval. In some embodiments, the caching architecture utilizes a cache table, such as a lookup table, for maintaining host data units that are cached or are candidates for being cached in the solid-state memory. Updating and searching the cache table is performed in an efficient and scalable manner.

In some embodiments of the present invention, the caching architecture implements a caching policy for determining which host data units should be stored in cache memory. For example, the caching policy can be used to keep track of priority metrics for host data units, and based on the priority metrics determine which host data units should be cached, which host data units are candidates for being cached, and which host data units should be removed or evicted from cache memory. In some embodiments, the caching architecture maintains a segment control list and segment list that specify associations between particular cache table entries and particular segments. For instance, segments can correspond to different types of host data, such as frequently accessed data during normal operation, data accessed during start up, and so on. Such separation of activities related to the implementation of caching policy from activities related to storing cached data and candidate data provides robustness and improves performance.

System Overview

FIG. 1 illustrates a combination 100 of a host system and a data storage system according to one embodiment of the invention. As is shown, the data storage system 120 (e.g., a hard disk drive, hybrid disk drive, solid-state drive, etc.) includes a controller 130, a non-volatile memory module 150, which can be optionally connected via a bridge interface 140, and a magnetic storage module 160. The magnetic storage module 160 comprises magnetic media 164 (e.g., one or more magnetic disks) and a cache buffer 162 (e.g., DRAM). The non-volatile memory module 150 comprises solid-state or non-volatile memory, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), Magnetoresistive RAM (MRAM), other discrete NVM (non-volatile memory) chips, or any combination thereof. The non-volatile memory module 150 also comprises a cache buffer 152 (e.g., DRAM), which can be used for temporarily storing host and system data. In one embodiment, at least a portion of the non-volatile memory module 150 is used as cache. The bridge interface 140 can be configured to perform basic signal processing and channel management of solid-state memory, as well as some basic error correction functions and XOR parity accumulation.

The controller 130 can be configured to receive data and/or storage access commands from a storage interface module 112 (e.g., a device driver) of a host system 110. Storage access commands communicated by the storage interface 112 can include write data and read data commands issued by the host system 110. Read and write commands can specify a logical address (e.g., logical block address or LBA) used to access the data storage system 120. The controller 130 can execute the received commands in the non-volatile memory module 150 and/or the magnetic storage module 160. Optionally, storage access commands are communicated to a media transport manager (MTM) 134, which determines whether a particular command should be executed in the non-volatile memory module 150 and/or magnetic storage module 160.

Data storage system 120 can store data communicated by the host system 110. In other words, the data storage system 120 can act as memory storage for the host system 110. To facilitate this function, the controller 130 can implement a logical interface. The logical interface can present to the host system 110 data storage system's memory as a set of logical addresses (e.g., contiguous address) where host data can be stored. Internally, the controller 130 can map logical addresses to various physical locations or addresses in the non-volatile memory module 150 and/or the magnetic storage module 160.

The controller includes an allocation cluster descriptor (ACD) module 132, which is configured to implement a caching architecture that improves performance while maintaining reliability, coherency, and scalability. In one embodiment, the caching architecture utilizes a cache table, such as a lookup table, for referencing or storing host data units that are cached or are candidates for being cached in the solid-state memory. Updating and searching the cache table is performed in an efficient and scalable manner. The caching architecture can also be configured to implement a caching policy by maintaining a segment control list that specifies associations between a particular cache table entries and particular segments. Such separation of activities related to the implementation of caching policy from activities related to storing cached data and candidate data provides robustness and improves performance.

Figure 2A:
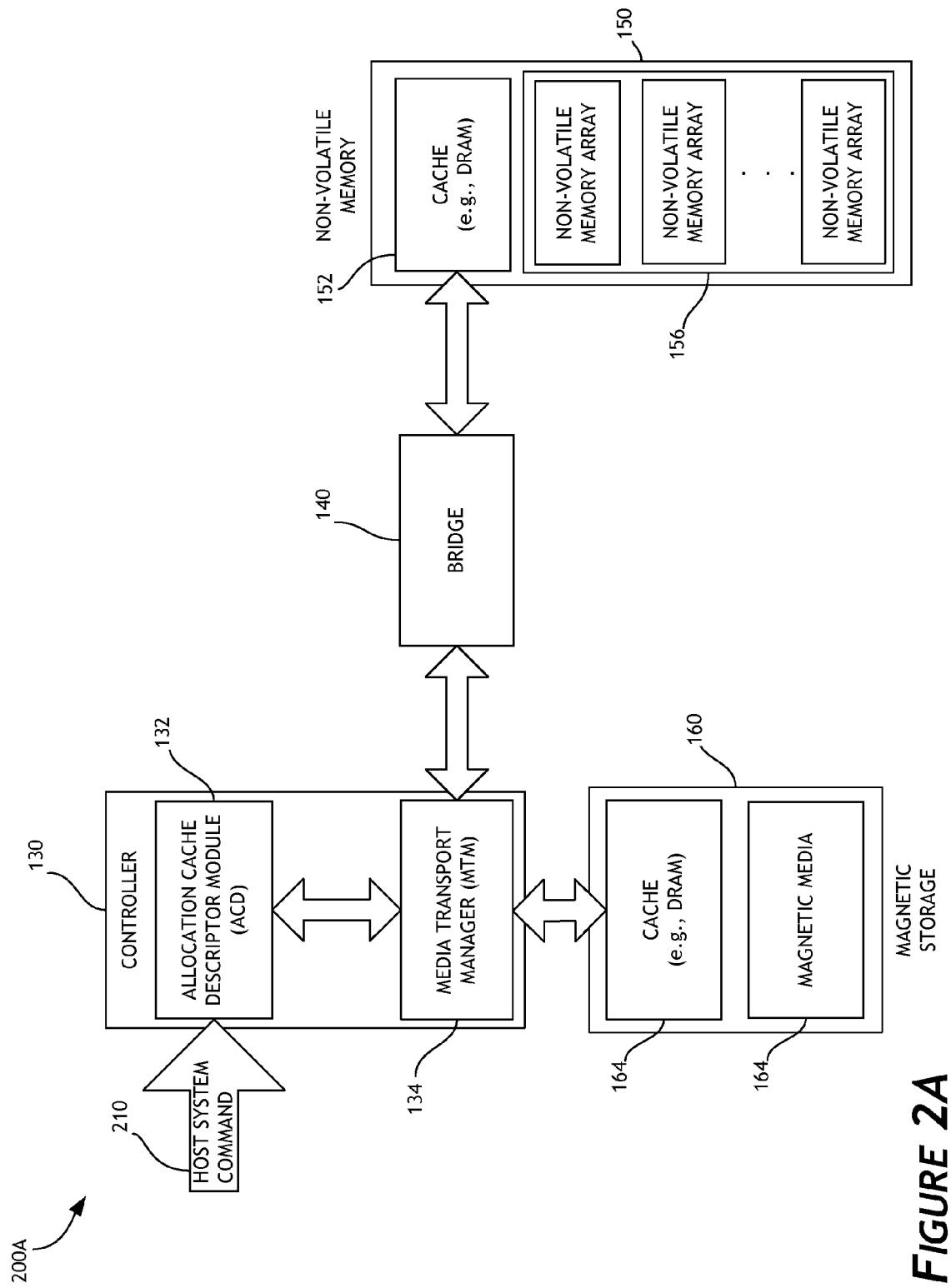
FIG. 2A illustrates a data storage system according to one embodiment of the invention.

FIG. 2A illustrates a data storage system 200A according to one embodiment of the invention. The data storage system 200A receives and processes storage access commands 210 from the host system 110. The ACD module 132 implements the caching architecture, which determines which host data units should be cached in the non-volatile memory module 150 or are candidates for being cached in the non-volatile memory module 150. Optionally, storage access commands 210 are communicated to the MTM 134, which determines whether a particular command 210 should be executed in the non-volatile memory module 150 and/or magnetic storage module 160. The non-volatile memory module 150 comprises one or more nonvolatile memory arrays 156, such as NAND memory arrays, NOR memory arrays, etc. The non-volatile memory module 150 optionally interfaces the MTM 134 via the bridge 140. In on embodiment, the non-volatile memory module 150 comprises the cache buffer 152. In on embodiment, the magnetic storage module 160 also comprises the cache buffer 162.

Figure 2B:
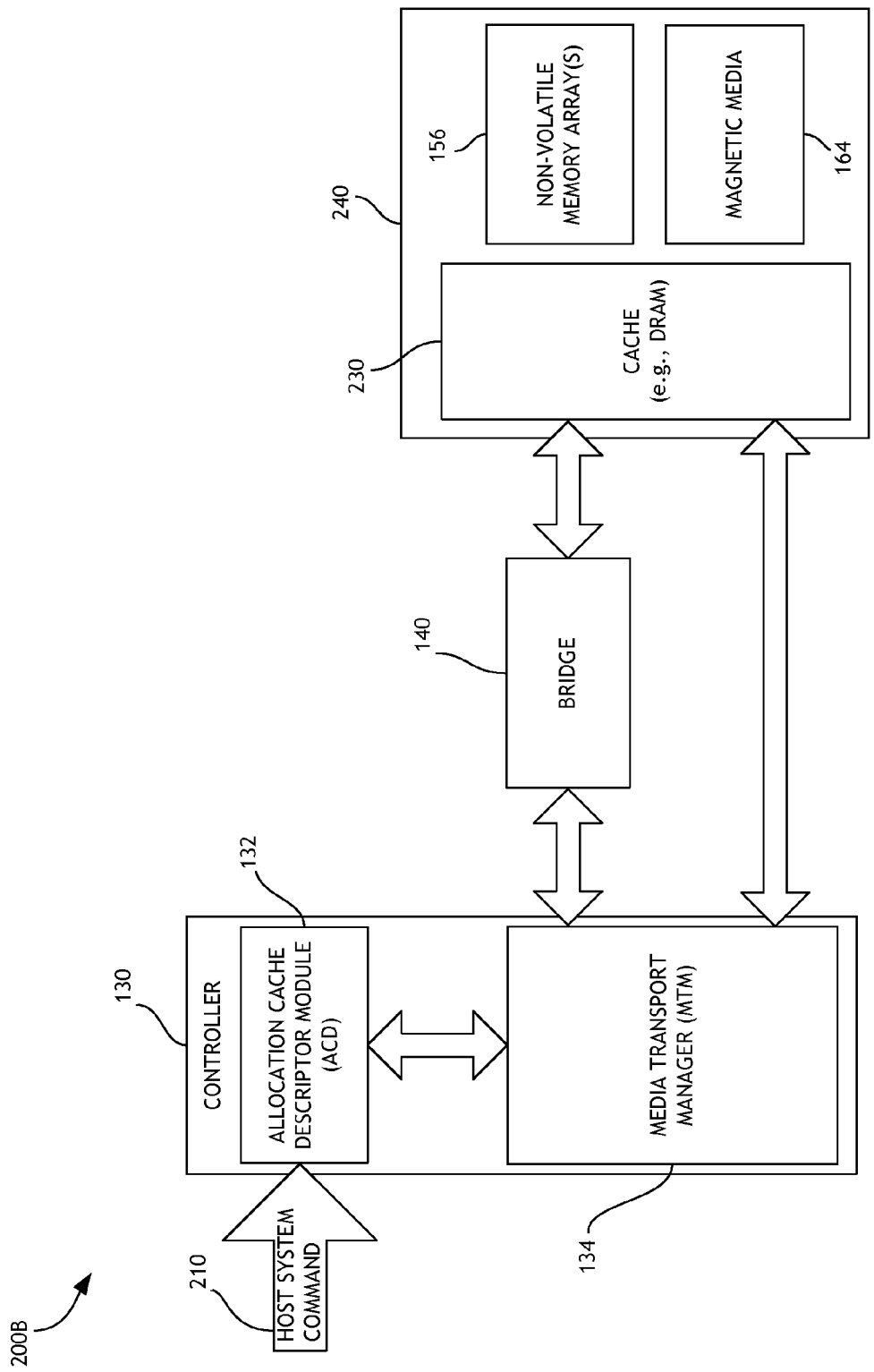
FIG. 2B illustrates a data storage system according to another embodiment of the invention.

FIG. 2B illustrates a data storage system 200B according to another embodiment of the invention. The data storage system 200B comprises a storage module 240, which includes one or more non-volatile memory arrays 156, magnetic media 164, and a cache module 230. The data storage system 200B receives and processes storage access commands 210 from the host system 110. The ACD module 132 implements the caching architecture, which determines which host data units should be cached in the non-volatile memory array 156 or are candidates for being cached in the non-volatile memory array 156. Optionally, storage access commands 210 are communicated to the MTM 134, which determines whether a particular command 210 should be executed in the non-volatile memory array 156 and/or magnetic storage module 160. Non-volatile memory 156 optionally interfaces the MTM 134 via the bridge 140. In one embodiment, host data can be stored either in non-volatile memory 156 or in magnetic media 164. There are no data coherency concerns in this case since only a single copy of data is stored in the data storage system 200B.

Figure 4A:
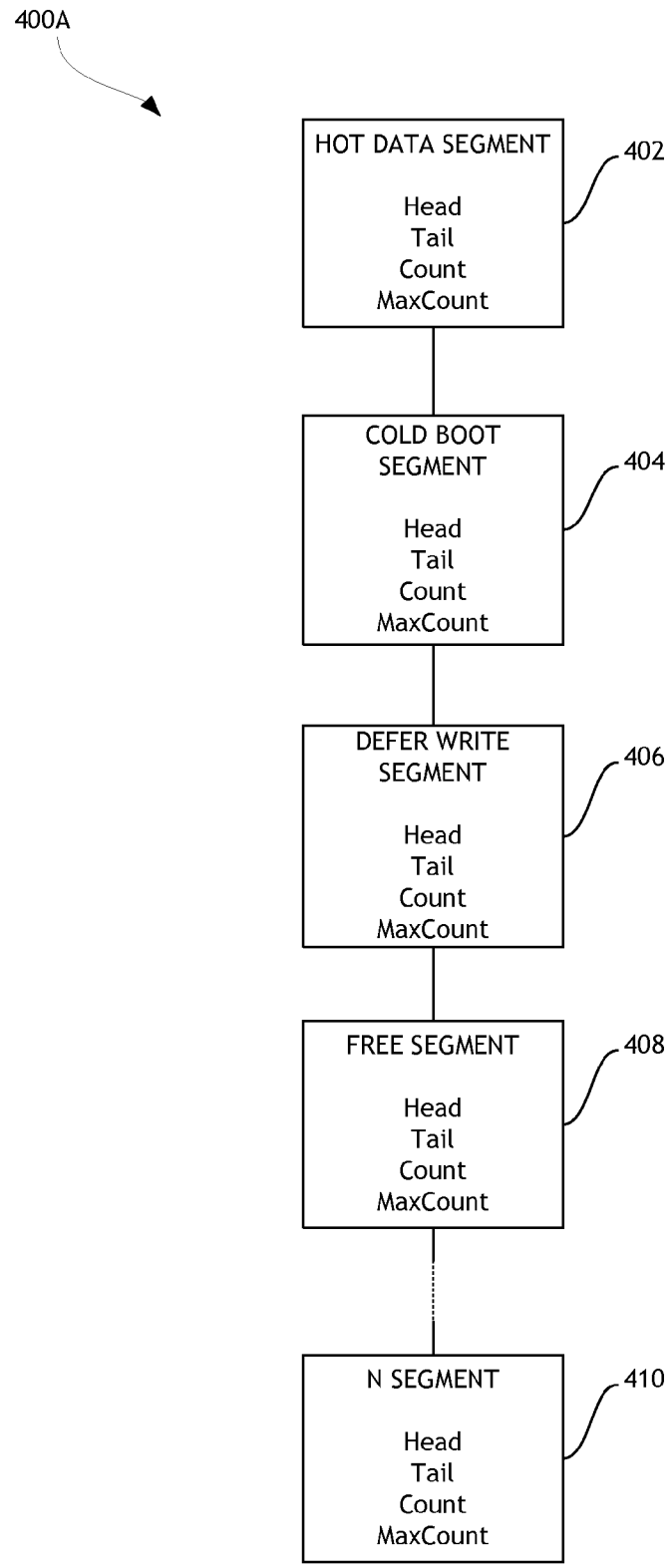
FIG. 4A illustrates a segment control list according to one embodiment of the invention.
Figure 4B:
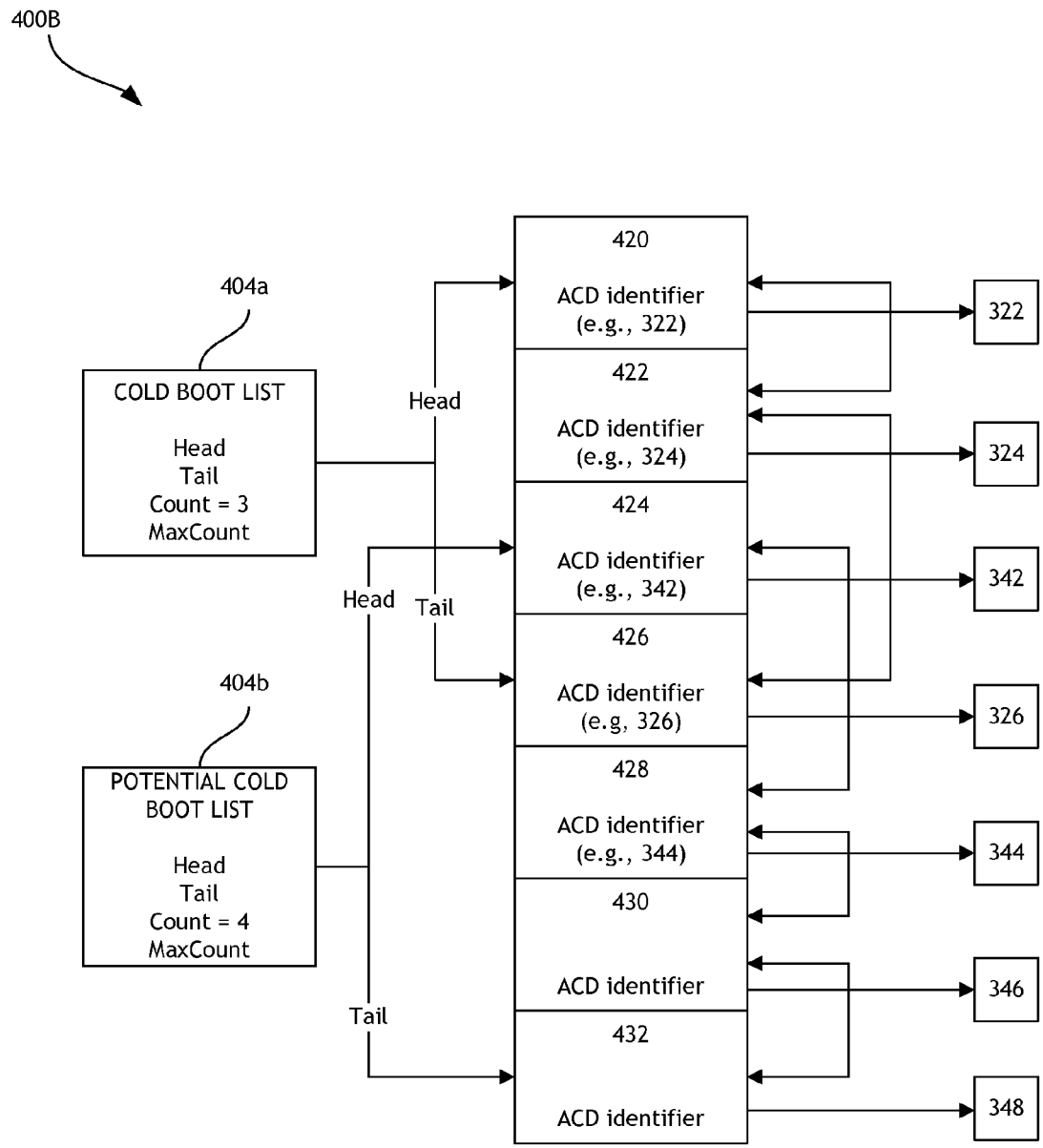
FIG. 4B illustrates a segment list according to one embodiment of the invention.
Figure 5:
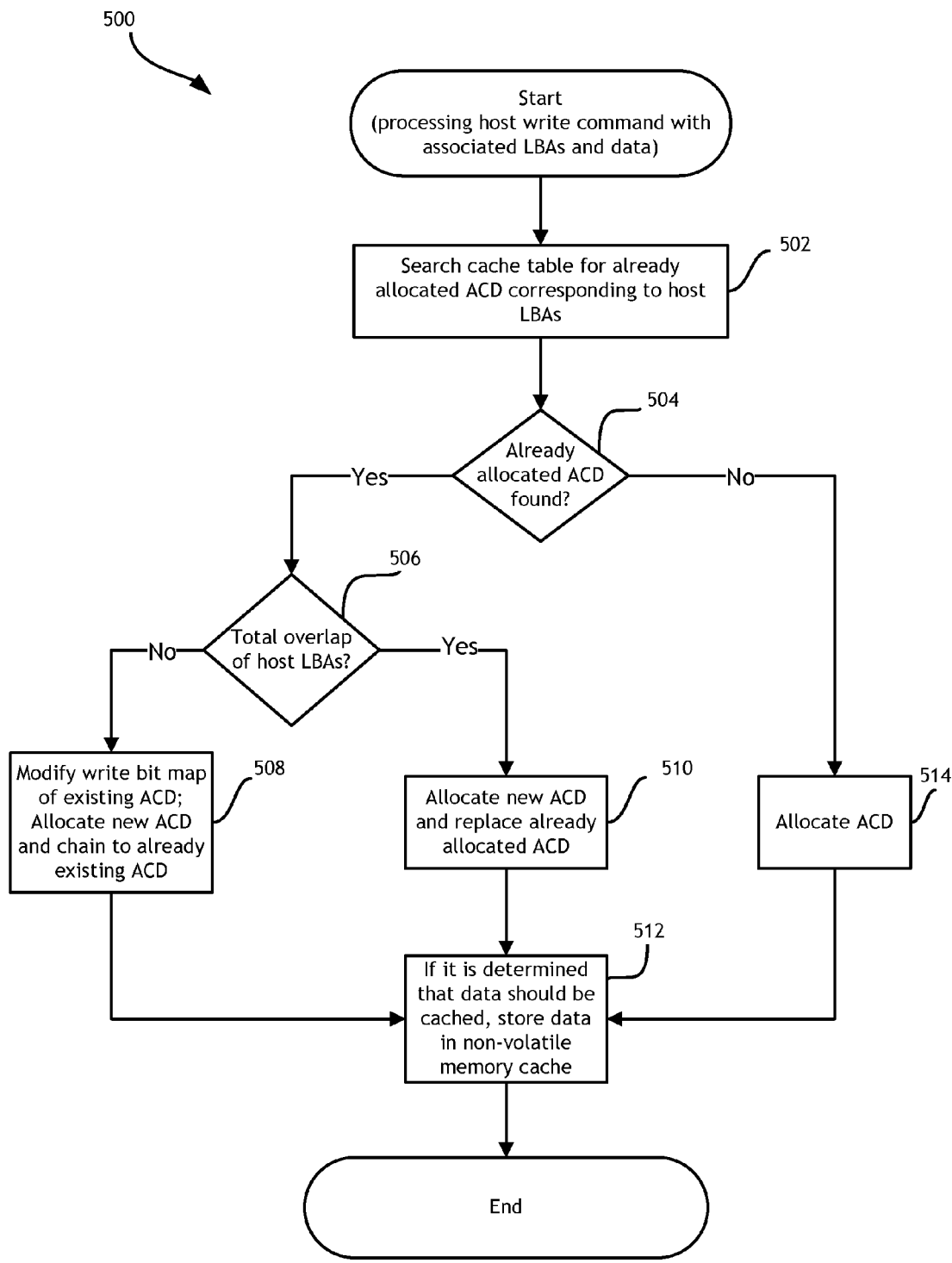
FIG. 5 illustrates a flow diagram of processing storage access commands according to one embodiment of the invention.
Figure 6:
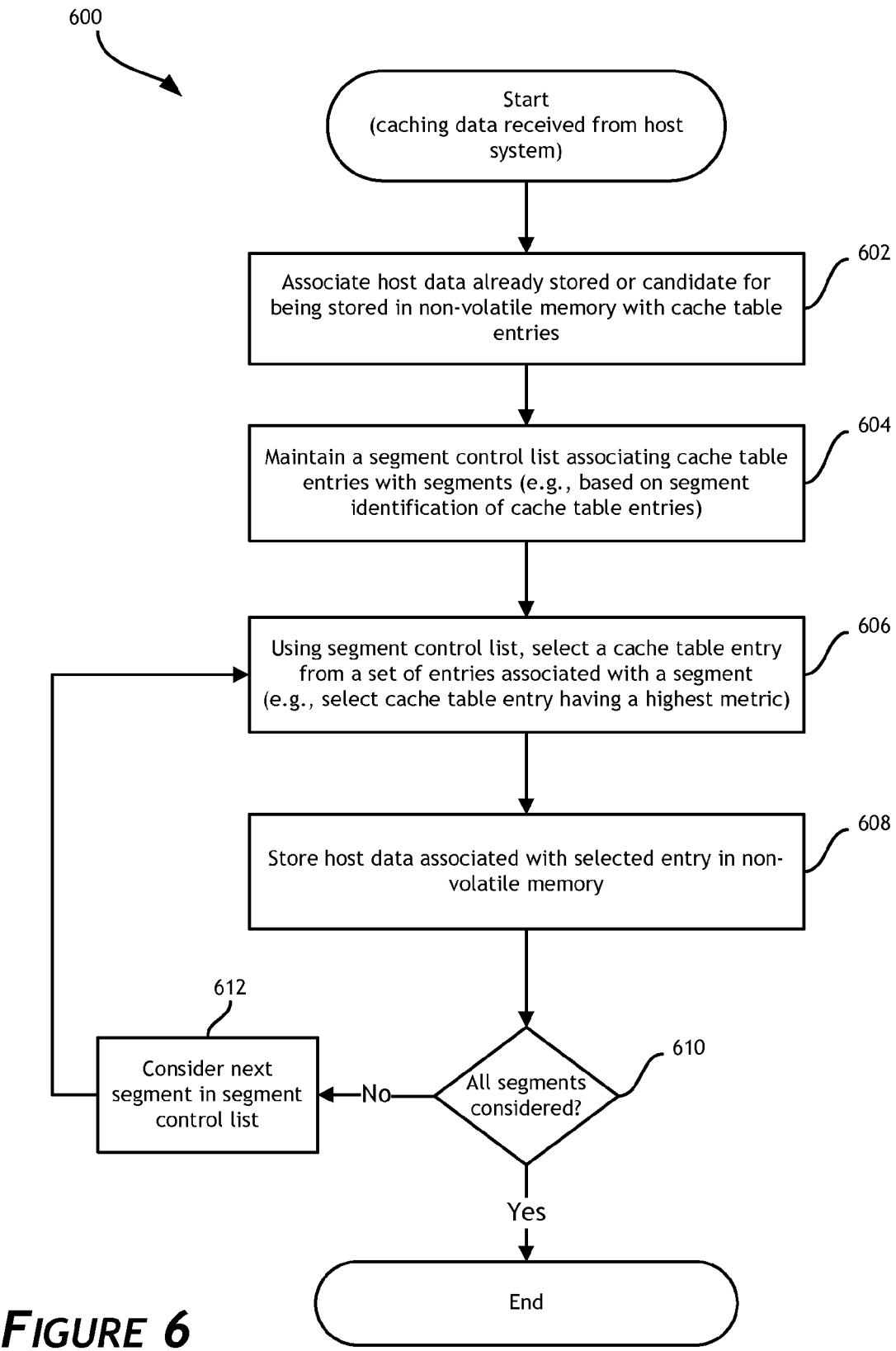
FIG. 6 illustrates a flow diagram of caching host data according to one embodiment of the invention.

The caching architecture components that will be described with reference to FIGS. 3A, 3B, 4A, and 4B and the process flows that will be described with reference to FIGS. 5 and 6 are applicable to the embodiment of data storage system 120 of FIG. 1, the embodiment of data storage system 200A of FIG. 2A, and the embodiment of data storage system 200B of FIG. 2B, and to variations of these embodiments.

Cache Table

Figure 3A:
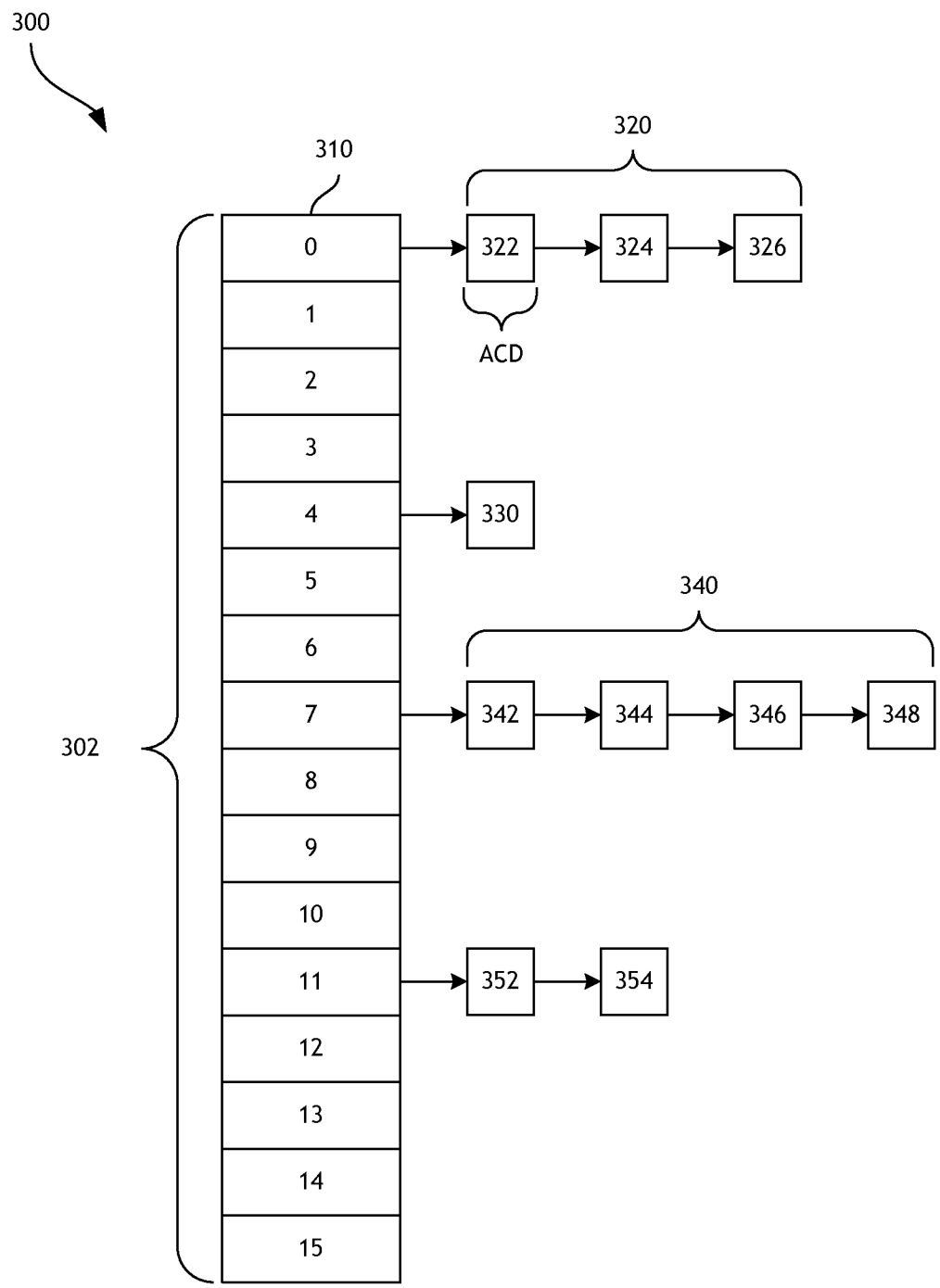
FIG. 3A illustrates a cache table according to one embodiment of the invention.

FIG. 3A illustrates a cache table 300 according to one embodiment of the invention. The cache table can be generated and maintained (e.g., updated) by the controller 130 (e.g., by the ACD module 132). In one embodiment, the cache table 300 comprises a look up table, such as a hash table. In other embodiments, any suitable data structure can be used, including a tree (e.g., binary search tree), a heap (e.g., binary heap), a list (e.g., linked list), a graph, etc.

As is illustrated in this example, the cache table 300 comprises an array 302 and nodes or entries 322, 324, 326, 330, 342, 344, 346, 348, 352, 354. Those skilled in the art will recognize that different numbers of nodes or entries can be used in other implementations. In one embodiment, the cache table 300 is a hash table. The array 302 comprises indices which are determined by a mapping provided by a hash function. In one embodiment, the following hash function is used:

$$(\text{LBA \% Hash Array Size/Media Cluster Size}) \tag{1}$$

where Hash Array Size corresponds to the size of array 302 and Media Cluster Size represents the smallest amount of logical memory space of the storage system 120 that can be programmed atomically (e.g., in a single non-volatile memory program operation). In one embodiment, selection of the size of the array 302 (e.g., number of hash indices) represents a tradeoff between conserving space and lookup speed (e.g., collision avoidance). The hash function is selected so that a host data unit associated with a given logical address can be efficiently located in the non-volatile memory cache.

The array 302 comprises elements, such as element 310, which are associated with indices. Each element can be further associated with entries 322, 324, 326, 330, 342, 344, 346, 348, 352, 354, which correspond to host data units that are cached or are candidates for being cached in the non-volatile memory cache. The entries can be referred to as allocation cluster descriptors (ACD). Those ordinarily skilled in the art will recognize that other naming conventions and/or abbreviations can be used. In one embodiment, the number of entries can be selected to exceed the capacity of non-volatile memory cache so that the caching architecture determines and maintains a set of host data units that are candidates for being cached. In one embodiment, the number of entries is determined according to:

$$\text{Number of Entries=(Cache Size/Mapping Unit)+ Overprovision} \tag{2}$$

where the mapping unit represents the smallest unit of non-volatile memory that can be erased (e.g., a block) and overprovision can be selected as a value between 20% or smaller and 50% or greater (e.g., 100%). In one embodiment, selection of the number of entries reflects a tradeoff between speed of retrieval and searching overhead.

As is illustrated, more than one entry or ACD can be mapped to the same index. This can be referred to as a collision. In one embodiment, collisions can be handled by chaining or linking entries as is illustrated, for example, by the chain 320 in which entries 322, 324, and 326 are linked. In one embodiment, to achieve fast look-ups, chains should be kept short in order to avoid extensive linear searches for host data units associated with chained entries. In other words, the goal of the caching architecture is to achieve a constant time retrieval, which, using big O notation, can be represented as O(1).

Figure 3B:
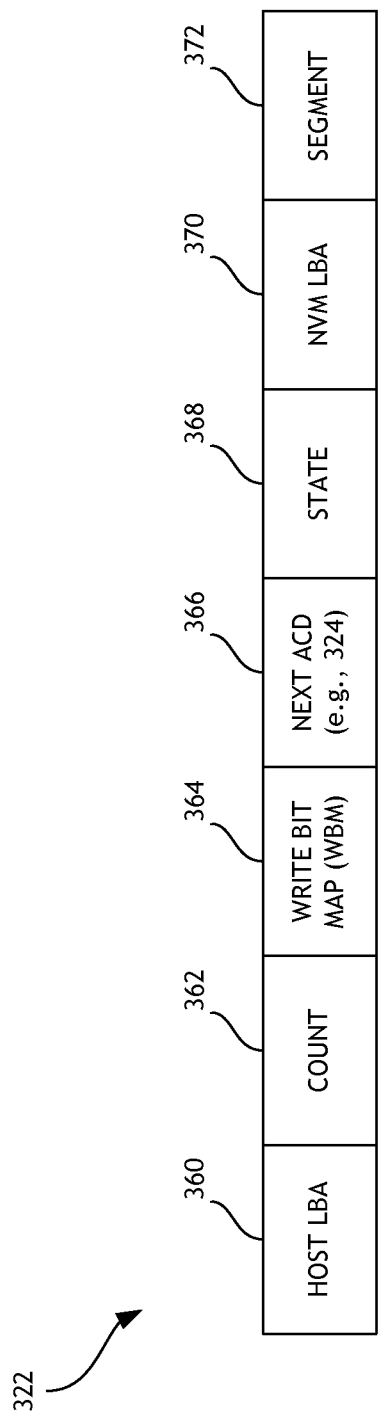
FIG. 3B illustrates a cache table entry according to one embodiment of the invention.

FIG. 3B illustrates a cache table entry 322 according to one embodiment of the invention. Cache table entry 322 includes multiple fields. Field 360 represents the logical address (e.g., LBA) of host data unit or units that are associated with the entry 322. Field 362 corresponds to a count of consecutive or sequential host data units that are stored beginning with the logical address represented by field 360. Alternatively, non-consecutive data can be stored at the logical address represented by the field 360, and field 364 reflects a map (e.g., write bit map) that represents which host data units are valid. For example, the logical address can correspond to a start of a page of non-volatile memory, but the host system desires to write or program a partial page. In this case, field 364 reflects which locations or bits in the page correspond to valid host data. As another example, the host system desires to write or program several non-consecutive pages in a block of non-volatile memory, and field 364 reflects which pages correspond to valid host data.

Field 366 corresponds to next entry or ACD in the collision chain. For example, with reference to FIG. 3A, field 366 corresponds to entry 324. Field 368 represents a state of entry 322. Multiple states can be used, such as, host data corresponding to the entry is present in the non-volatile cache, host data corresponding to the entry is a candidate for being cached, host data corresponding to the entry is on its way to the non-volatile cache, and so on. Field 370 reflects a location or logical address in the non-volatile memory cache where host data unit or units associated with entry 322 is cached. For host data that is a candidate for being cached, field 370 can reflect a location or logical address in the magnetic storage 160 where host data is stored. Alternatively, entry 322 can comprise a field that stores host data unit or units associated with the entry, and field 370 may then be superfluous.

Field 372 reflects which cache segment host data associated with the entry 322 corresponds to. In one embodiment, each entry is associated with a particular segment based on the type of host data corresponding to the entry. For instance, segments can be associated with different types of host data, such as frequently accessed data during normal operation, data accessed during start up, data that should be but could not yet be stored in the magnetic media 160 because, for instance, magnetic media is not spinning (referred to as defer write data), and so on. In other embodiments, some of the fields may appear in a different order, and some fields may be combined together or omitted altogether.

Caching Segments

In one embodiment, the caching architecture utilizes one or more lists to manage entries or ACDs associated with each particular segment. Segment lists can be generated and maintained (e.g., updated) by the controller 130 (e.g., by the ACD module 132). The segments can be managed as linked list or using any other suitable data structure. In one embodiment, each segment is associated with a segment control list, which comprises parameters such as head (e.g., first) ACD in the segment, tail (e.g., last) ACD in the segment, count (e.g., number) of ACDs in the segment, maximum count (e.g., maximum allowed number) of ACDs in the segment, and so on.

FIG. 4A illustrates a segment control list 400A according to one embodiment of the invention. Segment control list 402 corresponds to hot data (e.g., frequently accessed) segment. Segment control list 404 corresponds to cold boot data (e.g., data that is accessed during start up) segment. Segment 406 corresponds to defer write data (e.g., data that should be but could not yet be stored in the magnetic media). Segment 408 corresponds to free data (e.g., entries or ACDs that have not yet been associated with host data unit or units). Other segment control lists can be used, which is reflected by the N segment 410. For example, segment 410 can correspond to trim data (e.g., data that that should be erased because it is no longer valid). The trim segment can be utilized during garbage collection operation, which reclaims non-volatile memory space for future use.

FIG. 4B illustrates a segment list 400B according to one embodiment of the invention. Segment list 400B corresponds to cold boot data. In one embodiment, segment list 400B is accessed via the segment control list 404. Segment list 400B can comprise two parts: list 404a, which is associated with entries or ACDs corresponding to host data units that have been cached, and list 404b, which is associated with entries or ACDs corresponding to host data units that are candidates for caching in the non-volatile memory. The list 404a includes an index (e.g., pointer) to the head entry 420, which comprises an ACD identifier. The ACD identifier corresponds to the entry in the cache table 300 whose host data unit is of cold boot data type. For example, the entry can be ACD 322. Segment lists 404a and 404b can be maintained as double linked list, although any type of suitable data structure can be used.

Head entry 420 includes a reference or identifier (e.g., link) to the next entry 422 in the segment. Entry 422 comprises an ACD identifier, which corresponds to the entry 324 in the cache table 300. Entry 422 includes a reference or identifier (e.g., link) to the next entry 426 in the segment. As is illustrated, entry 426 is the tail entry. Entry 426 comprises an ACD identifier, which corresponds to the entry 326 in the cache table 300. In the embodiment illustrated in FIG. 4B, the cold boot segment comprises the ACDs in the chain 320.

List 404b is associated with entries corresponding to cold boot segment host data units that are candidates for being cached in the non-volatile memory. The list 404b includes an index (e.g., pointer) to the head entry 424, which comprises an ACD identifier corresponding to the ACD 342. Head entry 424 comprises a reference (e.g., link) to next entry 428 in the segment, which comprises an ACD identifier corresponding to the ACD 344. Entry 428 includes a reference (e.g., link) to the next entry 430 in the segment, which comprises an ACD identifier corresponding to the ACD 346. Finally, entry 430 includes a reference (e.g., link) to the tail entry 432, which comprises an ACD identifier corresponding to the ACD 348. In the embodiment illustrated in FIG. 4B, the cold boot candidates segment comprises ACDs in the chain 340.

In one embodiment, entries or ACDs are mutually exclusive among the various segments. In other words, a particular ACD can only be associated with a single segment. This approach provides a number of advantages, including, for example, ensuring and maintaining coherency of data stored in the storage system and saving storage space. For instance, the caching architecture determines that an entry or ACD should be allocated and added to the cold boot segment. The caching architecture can remove the ACD from the free segment, associate the ACD with host data unit or units, and attach the ACD at the tail of the cold boot segment. In one embodiment, the free segment control list 408 is accessed and an ACD is removed from the head of the free segment list. That ACD is then associated with host data unit or units and attached at the tail of the cold boot segment (which is determined by accessing the cold boot control list 404).

The caching architecture can use the cache table, segment control lists, and segment lists to implement a caching policy. In one embodiment, entries in the segment lists can each be associated with or assigned a metric or a score, which reflects the predicted performance benefit of caching host data unit or units associated with the entry. For hot data, for example, the metric can reflect the frequency of access of the host data unit or units associated with an entry (e.g., the metric can be a counter reflecting the number of accesses). Entries in the segment list can be ordered according to their respective metrics. The caching policy can determine which entries from a candidate list should be cached by selecting, for instance, an entry with the highest (or lowest) metric and comparing the metric to a threshold. If the metric is determined to exceed (or be below) the threshold, host data unit or units associated with the entry can be stored in the non-volatile cache memory.

In one embodiment, the caching policy can implement a removal or an eviction policy for removing cached host data units from the non-volatile memory. In particular, it may be determined that higher (or lower) priority candidate data (e.g., data having a higher or lower metric) should be cached instead of certain host data units that are currently cached. The caching architecture can compare the respective metrics of candidate data with cached data, and determine whether candidate data should replace cached data in the non-volatile memory cache. For example, a cache entry with lowest (or highest) metric in a particular segment can be located using a corresponding segment list (e.g., via the associated segment control list) and the metric can be compared to the highest (or lowest) metric of a candidate entry in the particular segment. The candidate entry can be located using the corresponding segment list. If, as a result of the comparison, it is determined that the cached entry should be replaced, that entry is evicted from the non-volatile memory cache and is replaced with the candidate entry.

Recovering after Loss of Power

In one embodiment, the caching architecture can ensure that the cache table can be fully recovered following loss of power (e.g., shutdown, restart, power out, brown out, etc.). In other words, the controller 130 can be configured to periodically save (e.g., flush) the cache table 300 from volatile storage (e.g., cache buffer 152) to permanent storage, such as non-volatile memory 150 and/or magnetic storage 160. In one embodiment, segment control lists and segment lists can be reconstructed from the cache table. For example, because each cache table entry or ACD comprises a segment identification field (e.g., 372), segment control lists and segment lists can be reconstructed from the cache table 300. In another embodiment, segment control lists and segment lists can be stored (e.g., flushed) from volatile storage (e.g., cache buffer 152) to permanent storage, such as non-volatile memory 150 and/or magnetic storage 160, so that the order of entries in the segment lists can be fully reconstructed following loss of power. In yet another embodiment, the cache table can be stored to permanent storage more frequently than the segment control lists and segments lists because the cache table is updated and, therefore, changes more frequently than the segment controls lists and segment lists.

Example of Processing Storage Access Commands

FIG. 5 illustrates a flow diagram 500 of processing storage access commands according to one embodiment of the invention. The process 500 can be executed by the controller 130 (e.g., by the ACD module 132). The process 500 starts when the storage system 120 receives a storage access command, such as write command, from the host system 110. The write command is associated with one or more logical addresses (e.g., LBAs) and one or more host data units that should be stored in locations corresponding to the one or more logical addresses. In block 502, the process 500 determines whether the one or more host data units associated with the write command are already cached or are candidates for being cached in the non-volatile memory. In the other words, the process 500 searches the cache table 300 to determine whether entries or ACDs corresponding to the host data unit or units have already been allocated. In one embodiment, the process 500 searches the cache table 300 using the one or more logical addresses associated with the write command. If, in block 504, the process 500 determines that ACDs have not yet been allocated, the process allocates ACDs in block 514. In one embodiment, the process 500 may associate the allocated ACD or ACDs with a particular candidate segment list, such as hot data list, cold boot data list, and so on. In another embodiment, the process 500 may associate the allocated ACD or ACDs with a particular segment list, and store host data unit or units in the non-volatile cache in block 512, provided that the process determines that the one or more host data units should be cached.

If, in block 504, the process 500 determines that ACDs have previously been allocated, it transitions to block 506. In block 506, the process determines whether the previously allocated ACDs are associated with every logical address specified by the write data command (or are associated with every host data unit specified by the write data command). That is, the process 500 determines whether there is a total overlap of logical addresses. If this is the case, the process 500 transitions to block 510, where it allocates new ACD or ACDs (e.g., selects ACD or ACDs from the free list) and associates that new ACD or ACDs with the one or more logical addresses or the one or more host data units associated with the write command. The process 500 replaces the previously allocated ACD or ACDs with newly allocated ACD or ACDs. In one embodiment, the process 500 may associate newly allocated ACD or ACDs with a particular candidate segment list, such as hot data list, cold boot data list, and so on. In another embodiment, the process 500 may associate newly allocated ACD or ACDs with a particular segment list, and store host data unit or units in the non-volatile cache in block 512, provided that the process determines that the one or more host data units should be cached.

If, in block 506, the process 500 determines that the previously allocated ACDs are not associated with every logical address associated with the write command, the process transitions to block 508, where it handles a partial overlap. In block 508, the process 500 modifies the previously allocated ACD or ACDs to indicate that one or more of associated host data units are no longer valid. In other words, these host data units are being replaced with more recent one or more host data units associated with the write command. In one embodiment, the process 500 modifies field 364 of the previously allocated ACD or ACDs to indicate that certain associated host data units are no longer valid. For example, the process 500 can set corresponding write bit map bits to 0, 1, or another value that indicates that the associated data is no longer valid. In block 508, the process 500 allocates ACD or ACDs (e.g., selects ACD or ACDs from the free list) and associates new ACD or ACDs with the one or more logical addresses and/or the one or more host data units associated with the write command. The process 500 relates (e.g., chains) the newly allocated ACD or ACDs with the previously allocated ACD or ACDs. In one embodiment, the process 500 may associate newly allocated ACD or ACDs with a particular candidate segment list, such as hot data list, cold boot data list, and so on. In another embodiment, the process 500 may associate newly allocated ACD or ACDs with a particular segment list, and store host data unit or units in the non-volatile cache in block 512, provided that the process determines that the one or more host data units should be cached.

Example of Caching Host Data

FIG. 6 illustrates a flow diagram of caching host data according to one embodiment of the invention. The process 600 can be executed by the controller 130 (e.g., by the ACD module 132). The process 600 starts in block 602, where it associates host data units cached or candidates for being cached in the non-volatile memory with cache table entries (e.g., ACDs). In one embodiment, each entry includes a segment identification (e.g., field 372). In block 604, the process 600 maintains a segment control list which specifies associations between particular cache table entries and particular segments. In one embodiment, the association is based on the segment identification of the cache table entry. In block 606, the process 600 uses the segment control list to select one or more cache table entries from a set of entries associated with a particular segment. The selected one or more entries may be cached in the non-volatile memory. In one embodiment, the selected one or more entries have a metric that reflects suitability for being cached. For example, the metric can be associated with a value that is compared to a threshold, where the threshold is predetermined or is dynamically adjusted. The metric can reflect the predicted performance benefit of caching the associated host data unit or units in the non-volatile memory.

In block 608, the process 600 can store host data units associated with the selected entries in the non-volatile memory cache. In one embodiment, the process 600 stores the host data units immediately. For example, it may be advantageous to store host data accessed during start up in the non-volatile memory immediately because doing so significantly improves performance. In another embodiment, the process 600 defers or waits to store data. For example, it may be more efficient to first aggregate a number of host data units and then store them in the non-volatile memory.

In block 610, the process 600 optionally determines whether all segments have been considered. If it is determined that all segments have been considered, the process 600 terminates. Otherwise, the process 600 transitions to block 612 where it switches to the next segment. The process 600 then transitions to block 606 where it considers entries associated with the selected segment.

Conclusion

To achieve optimal performance, data storage systems can utilize a caching architecture that provides robust, reliable, scalable, and efficient performance during data storage and retrieval. The caching architecture can utilize a cache table, such as a lookup table, for referencing or storing host data units that are cached or are candidates for being cached in the solid-state memory. Updating and searching the cache table is performed in an efficient and scalable manner. The caching architecture can implement a caching policy for determining which host data units should be stored in the non-volatile cache memory. For instance, the caching architecture can maintain a segment control list that specifies associations between particular cache table entries and particular segments. Such separation of activities related to the implementation of caching policy from activities related to storing cached data and candidate data provides robustness and scalability while improving performance.

Other Variations

Those skilled in the art will appreciate that in some embodiments, other types of caching architectures can be implemented. In addition, the actual steps taken in the disclosed processes, such as the process illustrated in FIGS. 5 and 6, may differ from those shown in the figures. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and methods disclosed herein can be applied to hard disk drives, hybrid hard drives, and the like. In addition, other forms of storage (e.g., DRAM or SRAM, battery backed-up volatile DRAM or SRAM devices, EPROM, EEPROM memory, etc.) may additionally or alternatively be used. As another example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. In a disk drive system comprising a magnetic medium and non-volatile memory, a method of caching data received from a host system, the method comprising:
    maintaining a cache table having a plurality of entries, each entry corresponding to one or more host data units that are cached, or are candidates for being cached, in the non-volatile memory, each entry comprising a segment identification indicating a cache type of the one or more host data units;
    maintaining a segment control list specifying a plurality of cache types and one or more cache table entries associated with each of the plurality of cache types;
    using the segment control list, selecting a cache table entry associated with a particular cache type, the entry having a metric suitable for being cached in the non-volatile memory, wherein the metric reflects a predicted performance benefit of caching the one or more host data units associated with the selected entry in the non-volatile memory; and
    storing the one or more host data units associated with the selected entry in the non-volatile memory.

2. The method of claim 1, wherein the predicted performance benefit corresponds to a frequency of access by the host system of the associated one or more host data units.

3. The method of claim 1, further comprising determining that the metric is suitable by comparing the metric to a threshold.

4. The method of claim 1, wherein the cache table comprises a lookup table.

5. The method of claim 1, wherein the segment control list is used for:
caching host data units corresponding to the cache table entries in the non-volatile memory; and
evicting host data units corresponding to the cache table entries from the non-volatile memory.

6. The method of claim 1, further comprising maintaining the cache table in the disk drive system so that the cache table can be fully recovered after loss of power.

7. The method of claim 6, further comprising after loss of power reconstructing the segment control list using the recovered cache table.

8. The method of claim 1, wherein each entry from the plurality of cache table entries further comprises:
a logical address used by the host system, the logical address corresponding to the one or more host data units associated with an entry;
a count of consecutive host data units associated with the entry; and
a flag indicating whether at least one host data unit of the one or more host data units is stored in the non-volatile memory, wherein a set flag indicates that the at least one host data unit is stored in the non-volatile memory.

9. The method of claim 8, wherein:
the cache table comprises a lookup table;
the lookup table comprises a plurality of lookup table indices, each index associated with one or more lookup table entries; and
a lookup table entry of one or more lookup table entries associated with an index comprises a reference identifying a next lookup table entry associated with the index.

10. The method of claim 8, wherein when the flag of the entry is set, the entry further comprises:
a non-volatile memory address where the at least one host data unit is stored; and
a plurality of values indicating whether the one or more associated host data units comprise valid host data.

11. The method of claim 1, wherein a number of entries in the plurality of cache table entries exceeds a capacity of the non-volatile memory such that a subset of cache table entries is associated with a subset of host data units that are candidates for being cached in the non-volatile memory.

12. The method of claim 1, wherein:
the segment control list comprises a plurality of segment lists, each list corresponding to a segment from the plurality of segments; and
each cache table entry is associated with exactly one segment list.

13. The method of claim 1, wherein the plurality of cache types include at least one of frequently used data during normal operation, data accessed during start-up, and defer write data.

14. In a disk drive system comprising a magnetic medium and non-volatile memory, a method of caching data received from a host system, the method comprising:
maintaining a cache table having a plurality of entries, each entry corresponding to one or more host data units that are cached, or are candidates for being cached, in the non-volatile memory, each entry associated with one or more logical addresses used by the host system;
receiving a write data command from the host system, the write data command associated with a first plurality of logical addresses used by the host system and a first plurality of host data units corresponding to the first plurality of logical addresses;
determining whether the cache table contains a cache table entry associated with at least one logical address of the first plurality of logical addresses, wherein a plurality of cache table entries is associated with a second plurality of logical addresses corresponding to a second plurality of host data units; and
in response to determining that the cache table does not contain the cache table entry associated with at least one logical address of the first plurality of logical addresses, allocating a new cache table entry and associating the new cache table entry with the first plurality of logical addresses and a cache type.

15. The method of claim 14, further comprising storing the first plurality of host data units in the non-volatile memory.

16. The method of claim 14, further comprising:
in response to determining that the cache table contains the cache table entry associated with at least one logical address of the first plurality of logical addresses, determining whether the cache table entry is associated with every logical address of the first plurality of logical addresses; and
in response to determining that the cache table entry is associated with every logical address of the first plurality of logical addresses:
allocating a new cache table entry and associating the new cache table entry with the first plurality of logical addresses; and
replacing in the cache table the identified cache table entry with the new entry.

17. The method of claim 14, further comprising:
in response to determining that the cache table contains the cache table entry associated with at least one logical address of the first plurality of logical addresses, determining whether the cache table entry is associated with every logical address of the first plurality of logical addresses; and
in response to determining that the cache table entry is not associated with every logical address of the first plurality of logical addresses:
allocating a new cache table entry and associating the new cache table entry with the first plurality of logical addresses;
modifying a parameter of the identified cache table entry to indicate that at least one host data unit associated with the identified cache table entry comprises invalid host data; and
relating the identified cache table entry with the new cache table entry.

18. The method of claim 14, wherein the cache table comprises a lookup table.

19. A disk drive system comprising:
a magnetic medium configured to store data;
a non-volatile memory module configured to store data; and
a controller configured to:
maintain a cache table having a plurality of entries, each entry corresponding to one or more host data units that are cached, or are candidates for being cached, in the non-volatile memory, each entry comprising a segment identification indicating a cache type of the one or more host data units; and maintain a segment control list specifying a plurality of cache types and one or more cache table entries associated with each of the plurality of cache types.

20. The disk drive system of claim 19, wherein the controller is further configured to:

determine for each cache table entry a metric corresponding to a frequency of access by a host system of the associated one or more host data units;

select, using the segment control list, a cache table entry associated with a particular cache type, the entry having a metric suitable for being cached in the non-volatile memory; and store the one or more host data units associated with the selected entry in the non-volatile memory.

21. The disk drive system of claim 19, wherein in response to receiving a write data command from a host system, the write data command associated with a plurality of logical addresses used by the host system and a plurality of host data units corresponding to the plurality of logical addresses, the controller is further configured to:

identify a cache table entry associated with at least one host data unit of the plurality of host data units; and when the cache table entry is not identified, allocate a new cache table entry and associate the new cache table entry with the plurality of host data units.

22. The disk drive system of claim 19, wherein the controller is further configured to store the plurality of host data units in the non-volatile memory.

23. The disk drive system of claim 19, wherein the controller is further configured:

when the cache table entry is identified, determine whether the cache table entry is associated with every host data unit from the plurality of host data units; and in response to determining that the cache table entry is associated with every host data unit from the plurality of host data units:

allocate a new cache table entry and associate the new cache table entry with the plurality of host data units; and replace in the cache table the identified cache table entry with the new entry.

24. The disk drive system of claim 19, wherein the controller is further configured:

when the cache table entry is identified, determine whether the cache table entry is associated with every host data unit from the plurality of host data units; and in response to determining that the cache table entry is not associated with every host data unit from the plurality of host data units:

allocate a new cache table entry and associate the new cache table entry with the plurality of host data units;

modify a parameter of the identified cache table entry to indicate that at least one associated host data unit comprises invalid host data; and relate the identified cache table entry with the new cache table entry.

25. The disk drive system of claim 19, wherein:

the segment control list comprises a plurality of segment lists, each list corresponding to a segment from the plurality of segments; and each cache table entry is associated with exactly one segment list.

* * * * *